(12) United States Patent
Mirota et al.

(10) Patent No.: US 10,616,552 B2
(45) Date of Patent: Apr. 7, 2020

(54) MULTI-MODAL REAL-TIME CAMERA LOCALIZATION AND ENVIRONMENT MAPPING

(71) Applicant: Intel Corporation, Santa Clara, CA (US)

(72) Inventors: Daniel J. Mirota, San Jose, CA (US); Samer S. Barakat, Santa Clara, CA (US); Haowei Liu, Santa Clara, CA (US); Duc Q. Pham, San Jose, CA (US); Mohamed Selim Ben Himane, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 15/081,469

(22) Filed: Mar. 25, 2016

(65) Prior Publication Data

US 2017/0280129 A1   Sep. 28, 2017

(51) Int. Cl.
*H04N 13/204* (2018.01)
*H04N 13/257* (2018.01)
*G06T 7/70* (2017.01)
*G06T 7/593* (2017.01)

(52) U.S. Cl.
CPC ........... *H04N 13/204* (2018.05); *G06T 7/593* (2017.01); *G06T 7/70* (2017.01); *H04N 13/257* (2018.05); *G06T 2207/10024* (2013.01); *G06T 2207/10028* (2013.01); *G06T 2207/30244* (2013.01)

(58) Field of Classification Search
CPC . G06T 7/593; G06T 7/70; G06T 2207/10024; G06T 2207/10028; G06T 2207/30244; H04N 13/204; H04N 13/257

USPC .......................................................... 348/46
See application file for complete search history.

(56) References Cited

U.S. PATENT DOCUMENTS

| | | | | |
|---|---|---|---|---|
| 2009/0290758 A1* | 11/2009 | Ng-Thow-Hing | ........ | G06T 7/73 382/106 |
| 2010/0131900 A1* | 5/2010 | Spetalnick | ............ | G06F 17/276 715/825 |
| 2013/0162785 A1* | 6/2013 | Michot | ................ | G06K 9/6289 348/50 |
| 2014/0139639 A1* | 5/2014 | Wagner | .................. | G06T 17/00 348/46 |
| 2014/0285624 A1* | 9/2014 | Acquavella | ............. | G06T 19/20 348/46 |

(Continued)

OTHER PUBLICATIONS

Achtelik et al, "Visual-Inertial SLAM for a Small Helicopter in Large Outdoor Environments", IEEE/RSJ International Conference on Intelligent Robots and Systems, 2012, 2 pages.

(Continued)

*Primary Examiner* — Joseph G Ustaris
*Assistant Examiner* — Jimmy S Lee
(74) *Attorney, Agent, or Firm* — Finch & Maloney PLLC (57) ABSTRACT

Methods, apparatuses and systems may provide for conducting a quality assessment of a depth localization mode, a color localization mode and an inertia localization mode, and selecting one of the depth localization mode, the color localization mode or the inertia localization mode as an active localization mode based on the quality assessment. Additionally, a pose of a camera may be determined relative to a three-dimensional (3D) environment in accordance with the active localization mode.

24 Claims, 6 Drawing Sheets

(56) References Cited

U.S. PATENT DOCUMENTS

2016/0171703 A1* 6/2016 Rhee .................. G06T 7/80
382/154

OTHER PUBLICATIONS

Leutenegger et al., "Keyframe-Based Visual-Inertial SLAM Using Nonlinear Optimization", Robotics: Science and Systems 9, 2013, 8 pages.
Whelan et al., "ElasticFusion: Dense SLAM Without a Pose Graph", Robotics: Science and Systems 11, 2015, 9 pages.

* cited by examiner

MULTI-MODAL REAL-TIME CAMERA LOCALIZATION AND ENVIRONMENT MAPPING

BACKGROUND

Embodiments generally relate to camera localization. More particularly, embodiments relate to multi-modal real-time camera localization and environment mapping.

Virtual reality applications and three-dimensional (3D) gaming applications may submerse a user wearing a head-mounted camera into a 3D virtual environment. In such systems, camera localization and environment mapping may be conducted in order to translate "real world" movements of the user into movements in the 3D virtual environment. Conventional camera localization systems, however, may rely on only a single mode of data collection and analysis (e.g., collection and analysis of only combined depth and color data), which may result in failures that interrupt the user experience.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
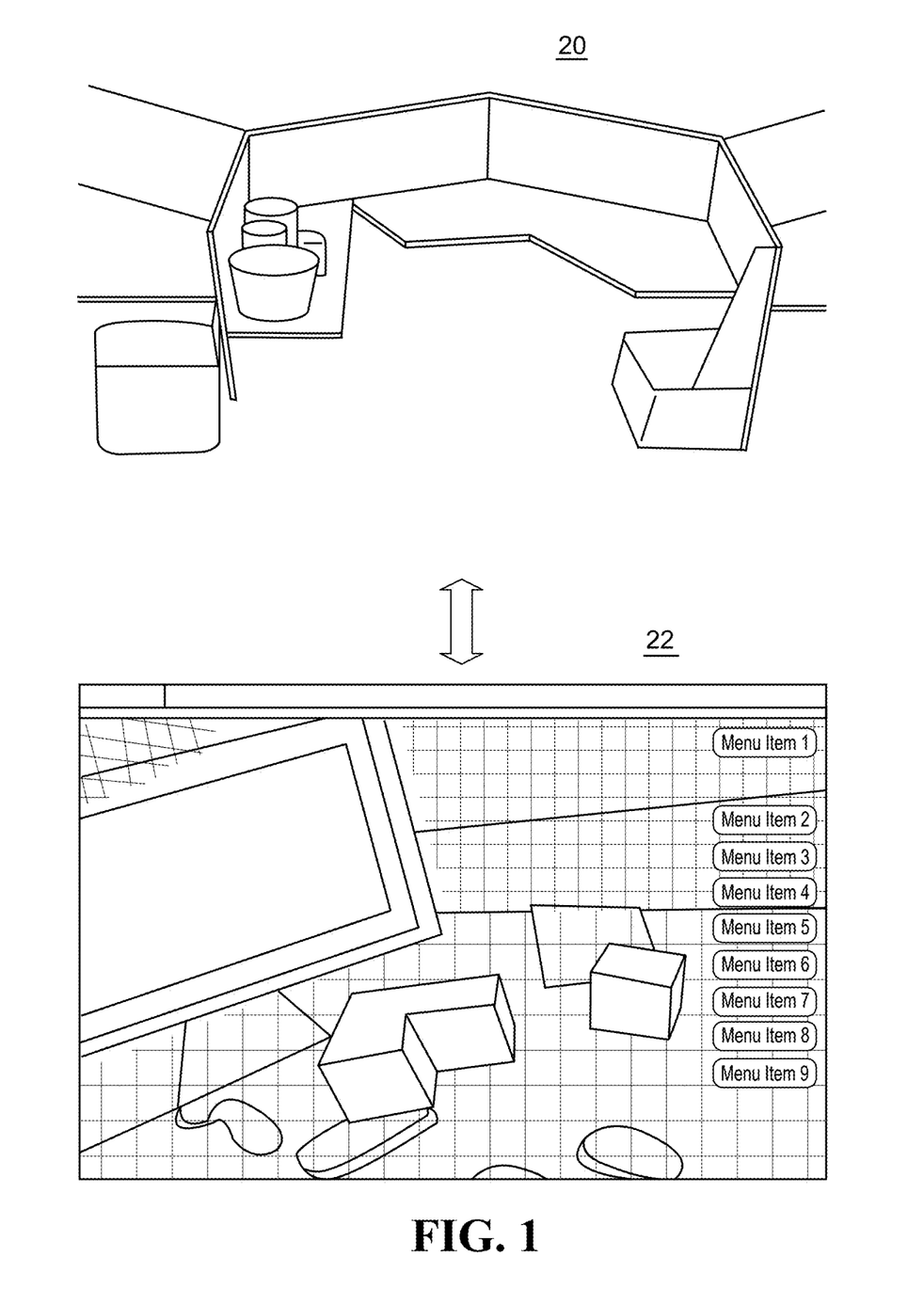
FIG. 1 is an illustration of an example of a mapping between a physical environment and a virtual environment according to an embodiment.

FIG. 1 shows a mapping between a physical environment 20 (e.g., a "real world" environment) and a virtual environment 22 (e.g., a game environment). The physical environment 20 may be captured by a camera configuration (e.g., depth camera, color camera, not shown) that is worn by, mounted to and/or carried by an individual/user (not shown) experiencing the virtual environment 22 via a display. For example, the virtual environment 22 might be presented on the interior of goggles being worn by the user, a user-facing screen of a device being held by the user, and so forth. As will be discussed in greater detail, "localization" of the camera configuration in the physical environment 20 may be conducted in a multi-modal fashion that avoids failures that may interrupt the user experience while the virtual environment 22 is being rendered.

For example, a quality assessment may be conducted of separate localization modes such as a depth localization mode, a color localization mode and an inertia localization mode, wherein the most appropriate mode may be selected in order to eliminate failures and maximize the quality of the mapping to the rendered virtual environment 22. Thus, if depth images do not provide sufficient information to localize the camera in the physical environment 20, the inertia localization mode may be activated so that inertia data (e.g., data obtained from a motion sensor such as an inertia monitoring unit/IMU, accelerometer and/or gyroscope) is used to map camera movements to the virtual environment 22 or the color localization mode may be activated so that color data (e.g., color images obtained from a camera) is used to map camera movements to the virtual environment 22. Similarly, if color images do not provide sufficient texture of the physical environment 20, the depth localization mode may be activated so that depth data (e.g., depth images obtained from a camera) is used to map camera movements to the virtual environment 22 or the inertia localization mode may be activated so that inertia data is used to map camera movements to the virtual environment 22. Moreover, if the inertia data accumulates drift over time (e.g., limiting accuracy for prolonged use), the depth localization mode or the color localization mode may be activated.

Figure 2:
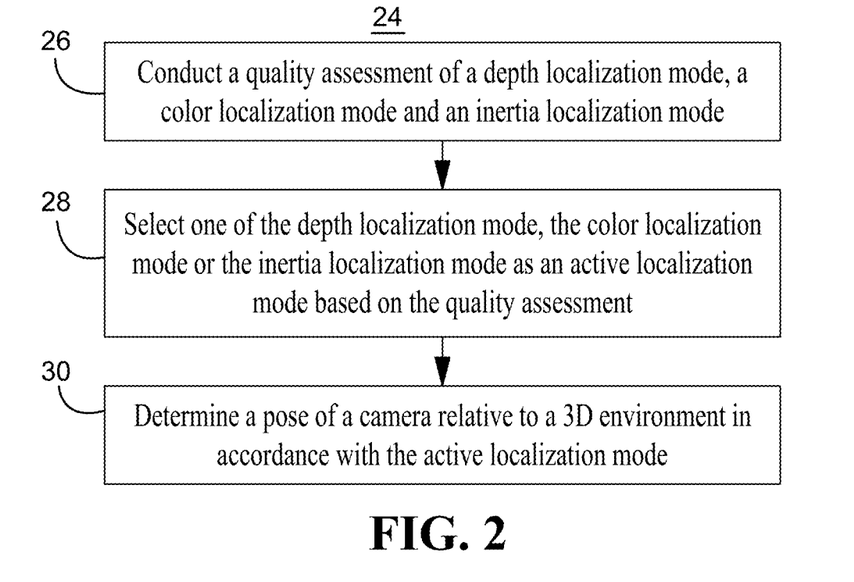
FIG. 2 is a flowchart of an example of a method of operating a camera localization apparatus according to an embodiment.

Turning now to FIG. 2, a method 24 of operating a camera localization apparatus is shown. The method 24 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 26 provides for conducting a quality assessment of a depth localization mode, a color localization mode and an inertia localization mode. The quality assessment may be determined based on inertia data, depth data and/or color data such as, for example, Red/Green/Blue (RGB) data. Block 26 may include, for example, determining whether the depth localization mode is expected to generate acceptable results, determining whether the color localization mode is expected to generate acceptable results, determining whether data is available from an inertia sensor, determining whether the inertia data has begun to accumulate drift, and so forth. Illustrated block 28 selects one of the depth localization mode, the color localization mode or the inertia localization mode as an active localization mode based on the quality assessment.

For example, block 28 might select the depth localization mode as the active localization mode if the quality assessment indicates that a confidence level associated with the depth localization mode is above a particular threshold (e.g., a "depth quality threshold"). Examples of a quality assessment may include evaluating, for example, the fill-rate of the depth image (i.e., the number of pixels with depth measurements), the entropy of the depth gradient, the distribution of the normal vectors in the depth image, or any measure that predicts the confidence of the depth localization mode result. The depth localization mode might include a dense depth based solution such as, for example, Iterative Closest Points using Gauss-Newton minimization, Levenberg-Marquardt minimization, etc., wherein the confidence level generally corresponds to the estimated quality of the depth localization mode results (e.g., poses generated by the depth localization mode).

By contrast, block 28 may select the inertia localization mode as the active localization mode if the quality assessment indicates that 1) a failure is detected with regard to the depth localization mode (e.g., due to a failure to record depth measures from the physical environment) or a confidence level associated with the inertia localization mode is above a particular threshold (e.g., an "inertia threshold") while the depth localization mode is unavailable. The unavailability of the depth localization mode might result from the initially estimated quality of the depth localization mode being relatively low.

Additionally, block 28 might select the color localization mode when the quality assessment indicates that 1) an initial confidence level associated with the depth localization mode is below a depth quality threshold, 2) a failure is detected with respect to the depth localization mode while the inertia localization mode is unavailable, 3) a failure is detected with respect to the inertia localization mode while the inertia localization mode is the active localization mode, or 4) a confidence level associated with the inertia localization mode drops below the inertia threshold while the inertia localization mode is the active localization mode. Other conditions may also be used.

Block 30 may determine a pose of a camera relative to a 3D environment such as, for example, the physical environment 20 (FIG. 1) in accordance with the active localization mode. Moreover, the pose may be used, along with synthetic depth images (e.g., including a set of key frames, "raycast" data, etc.) that are representative of the 3D environment, to render a virtual environment such as, for example, the virtual environment 22 (FIG. 1). As will be discussed in greater detail, the set of key frames may be established by determining the amount of overlap between a given depth image and a set of key frames associated with the 3D environment and adding the depth image to the set of key frames of the overlap is below a particular threshold (e.g., a "key frame threshold"). Moreover, in the case of inertia localization, the pose may be a relative pose. As will be discussed in greater detail, the method 24 may be implemented in a state machine.

Figure 3:
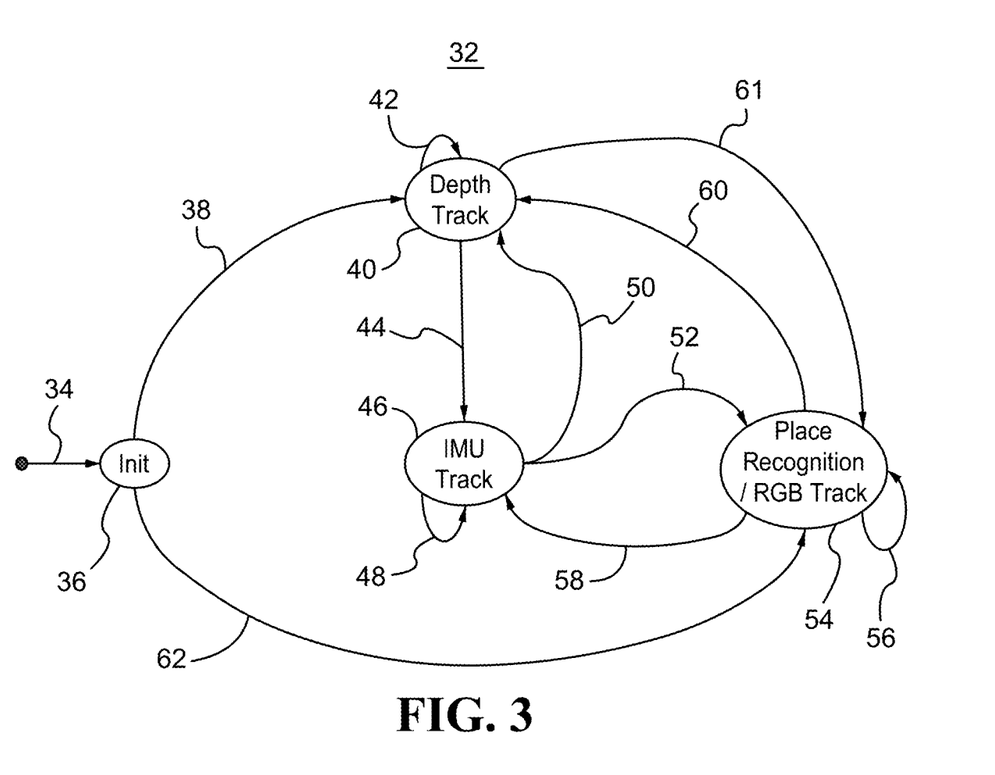
FIG. 3 is an illustration of an example of a state machine according to an embodiment.

FIG. 3 shows a state machine 32 that may be used to generate poses associated with the translation of 3D motions between a physical environment and a virtual environment. In the illustrated example, an initial transition 34 places the state machine in an initialization state 36. If a real-time quality assessment indicates that an initial confidence level associated with a depth localization state 40 is above a depth quality threshold, a high depth quality transition 38 may place the state machine 32 in the depth localization state 40 (e.g., "depth track" mode). While in the depth localization state 40, the state machine 32 may undergo one or more pose update transitions 42 in which depth images are added to a 3D environment map (e.g., accumulated) and raycasts from the 3D environment map are determined.

If the quality assessment indicates that a failure is detected with regard to the depth localization state 40, a depth failure transition 44 may place the state machine 32 in an inertia localization state 46 (e.g., "IMU track" mode). While in the inertia localization state 46, the state machine 32 may undergo one or more pose update transitions 48 in which accelerometer data, gyroscope data, etc., is used to determine the location and orientation of the camera relative to the 3D environment map. As will be discussed in greater detail, poses generated while the state machine 32 is in the inertia localization state 46 may be relative poses (e.g., each pose is relative to a most recent pose). If, while the state machine 32 is in the inertia localization state 46, the quality assessment indicates that the confidence level associated with the depth localization state 40 is once again above the depth quality threshold, a reset transition 50 may take place. The reset transition 50 may involve the accumulation of a new set of key frames that are representative of the 3D environment and the placing of the state machine 32 into the depth localization state 40.

The quality assessment may also indicate that a failure is detected with respect to the inertia localization state 46 while the inertia localization state 46 is the active localization mode. Similarly, the quality assessment may indicate that a confidence level associated with the inertia localization state 46 drops below an inertia threshold while the inertia localization state 46 is the active localization mode. In either case, a failure transition 52 may place the state machine 32 into a color localization state 54 (e.g., "Place Recognition" and/or "RGB Track" mode). While in the color localization state 54, the state machine 32 may undergo one or more pose update transitions 56 in which color data is used to determine the location and orientation of the camera relative to the 3D environment map.

If, while the state machine 32 is in the color localization state 54, the quality assessment indicates that the confidence level associated with the inertia localization state 46 is above the inertia threshold while the depth localization state 40 is unavailable, a return transition 58 places the illustrated state machine 32 into the inertia localization state 46. If, while the state machine 32 is in the color localization state 54, the quality assessment indicates that the confidence level associated with the depth localization state 40 is above the depth quality threshold, a return transition 60 may place the state machine 32 into the depth localization state 40.

If, while the state machine 32 is in the initialization state 36, the quality assessment indicates that the initial confidence level associated with the depth localization state 40 is below the depth quality threshold, the state machine 32 may undergo a low depth quality transition 62 into the color localization state 54. Additionally, a failure transition 64 may switch the state machine 32 from the depth localization state 40 to the color localization state 54 when the quality assessment indicates that a failure is detected with respect to the depth localization state 40 while the inertia localization state 46 is unavailable. The use of the state machine 32 may enhance performance through greater knowledge of the state of the data being used.

Figure 4:
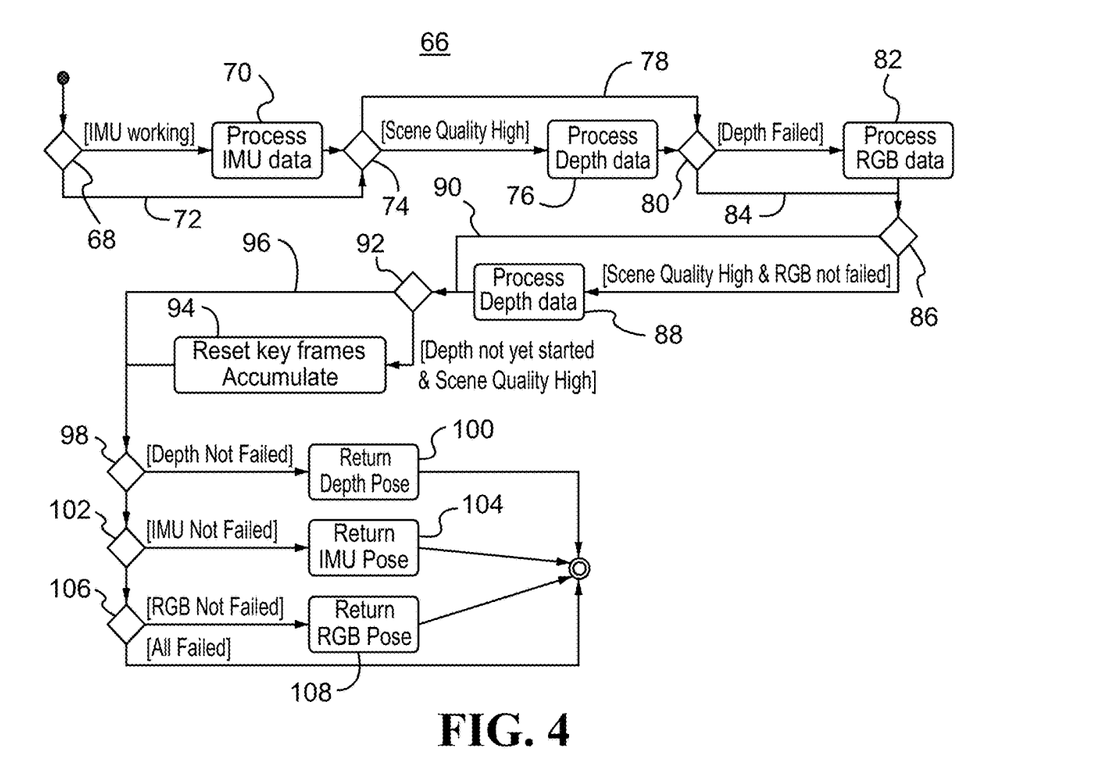
FIG. 4 is a flowchart of an example of a method of using key frames to operate a camera localization apparatus according to an embodiment.

Turning now to FIG. 4, a method 66 of using key frames to operate a camera localization apparatus is shown. The method 66 may be implemented as one or more modules in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated decision node 68 determines whether an IMU is working (e.g., warmup completed). If so, the inertia data from the IMU is processed at block 70. If the IMU is not working, an alternate path 72 may bypass block 70. A decision node 74 may then determine whether the scene quality is relatively high (e.g., the confidence level associated with the depth localization mode is above a depth quality threshold). If so, the depth data may be processed at block 76. If the scene quality is not relatively high, an alternate path 78 may bypass block 76. Additionally, a decision node 80 may determine whether a failure is detected with regard to the depth localization mode. If so, illustrated block 82 processes RGB data. If a failure is not detected with regard to the depth localization mode, an alternate path 84 may bypass block 82. Illustrated decision node 86 determines whether the scene quality is relatively high while a failure has not been detected with regard to the RGB data. If so, depth data may be processed at block 88. Otherwise, an alternate path 90 may bypass block 88.

The illustrated method 66 also includes a decision node 92 that determines whether the depth localization mode has not yet started while the scene quality is relatively high. In such a case, illustrated block 94 resets/deletes the key frames currently stored for the 3D environment and begins accumulating new key frames. If either the depth localization mode has already started or the scene quality is relatively low, an alternate path 96 may bypass block 94. Illustrated decision node 98 determines whether a failure has been detected with regard to the depth localization mode. If a failure has not been detected with regard to the depth localization mode, a pose is generated at illustrated block 100 by applying the depth data to the depth localization mode. If a depth failure has occurred, a decision node 102 may determine whether a failure has been detected with regard to the inertia localization mode.

If a failure has not been detected with regard to the inertia localization mode, a pose is generated at illustrated 104 by applying the inertia data to the inertia localization mode. More particularly, IMU sensor data may be capable of providing high accuracy tracking but only for short periods of time. This knowledge may be taken into consideration by only using the relative pose from the inertia localization mode. The relative pose may be computed by recording the relative transformation between the high accuracy dense depth localization mode and the inertia localization mode. Expression (1) below demonstrates the computation of the relative pose and Expression (2) below demonstrates the retrieval of the IMU pose. Within Expressions (1) and (2), variable names ending in "Pose" are 4×4 matrices representing a pose in SE(3) Pose=$[\vec{0}^T \ 1 \ ^R \ ^{\vec{t}}]$, where R is a 3×3 matrix representing a rotation (e.g., orientation) in O(3). The variables $\vec{t}$ and $\vec{0}$ are vectors in $R^3$, where $\vec{t}$ is position. T represents the vector transpose operation and superscript negative one (−1) is the pose inversion operation.

If high accuracy dense depth localization is successful:

relativePose=(highAccuracyDenseDepthPose)(IMUPose)$^{-1}$     Expression (1):

currentPose=(relativePose)(IMUPose)     Expression (2):

If an inertia failure has occurred, a decision node 106 may determine whether a failure has been detected with regard to the color localization mode. If a failure has not been detected with regard to the color localization mode, a pose is generated at illustrated block 108 by applying the color data to the color localization mode. If all modes have failed, the illustrated method 66 terminates without generating a pose.

During initialization, the relationship between the map orientation and a gravity vector supplied from the IMU may be computed. With the stored relationship between the map and gravity vector, future poses returned from any of the localization algorithms may be checked against the current measurement of the gravity vector. Accordingly, the illustrated method 66 eliminates any need for hard synchronization of the various input data. If all localization modes have failed, place recognition may be used to discover a previously observed location. The resultant pose may then be verified against the current environment 3D map using dense depth-based localization.

Figure 5:
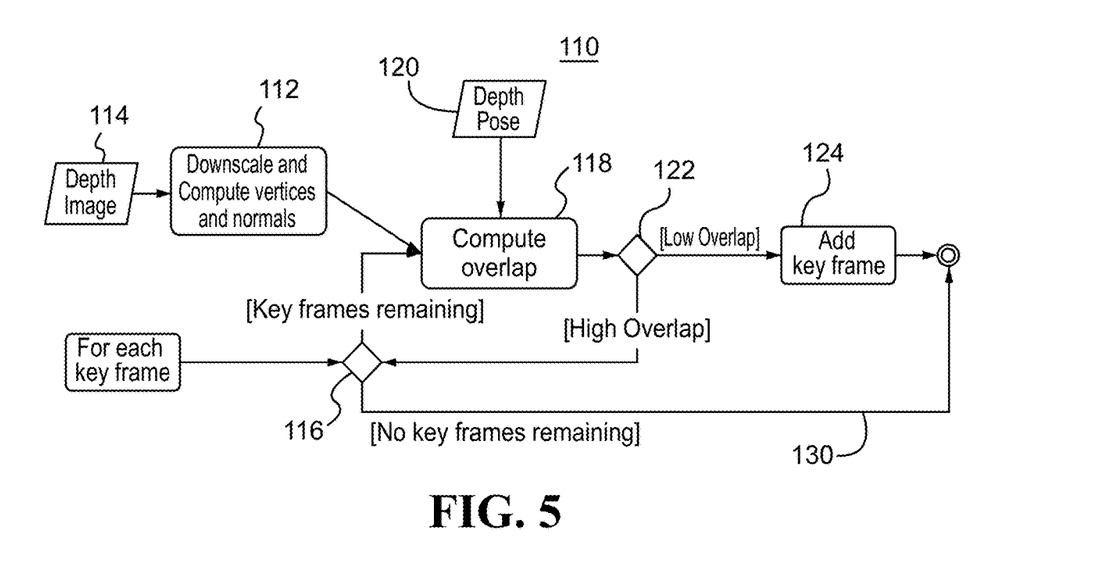
FIG. 5 is a flowchart of an example of a method of selecting key frames according to an embodiment.

Turning now to FIG. 5, a method 110 of selecting key frames is shown. The method 110 may generally substituted for block 94 (FIG. 4), already discussed. More particularly, the method 110 may be implemented as one or more modules in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

One part of the environment color map may be a set of salient color images, also known as key frames. The selection of the key frames may reduce the amount of data needed to represent the color of the environment. In one example, this set of images is the minimum set to cover the environment. In general, when a previously unobserved portion of the 3D environment is detected, depth data, color data and pose data associated with the previously unobserved portion may be added to the set of key frames. In one example, to make this selection, each key frame may be chosen based on the amount of overlap of depth with the current set of key frames, wherein the overlap takes into consideration the distance from camera and angle between observed surface and a ray from the camera. When there is little or no overlap with any of the existing set of key frames, a new color image may be added. To ensure the accuracy of the key frames location, each key frame may be collected only when a localization mode is working with high accuracy.

Illustrated processing block 112 receives a depth image 114, downscales the depth image 114, and computes vertices and normals (e.g., perpendicular rays) for the downscaled image. The computation of vertices may involve segmenting the image into primitives (e.g., triangles) based on the depth data associated with the depth image 114. Additionally, a block 118 may receive a depth pose 120, the vertices and normals from block 112, and a key frame, and compute the overlap between the depth image 114 and the key frame. A decision node 122 may determine whether the overlap between the depth image 114 and the key frame is relatively low or relatively high (e.g., using a "key frame threshold"). If the overlap is relatively low, illustrated block 124 adds the depth image 114 to the set of key frames and the illustrated method 110 terminates. If the overlap is relatively high, an alternate path 126 may bypass block 124. A decision node 116 may determine whether there are any key frames remaining. If so, a repeat path 128 may return to block 118 for the next key frame in the set. Otherwise, a termination path 130 may end the method 110 for the depth image 114.

Figure 6:
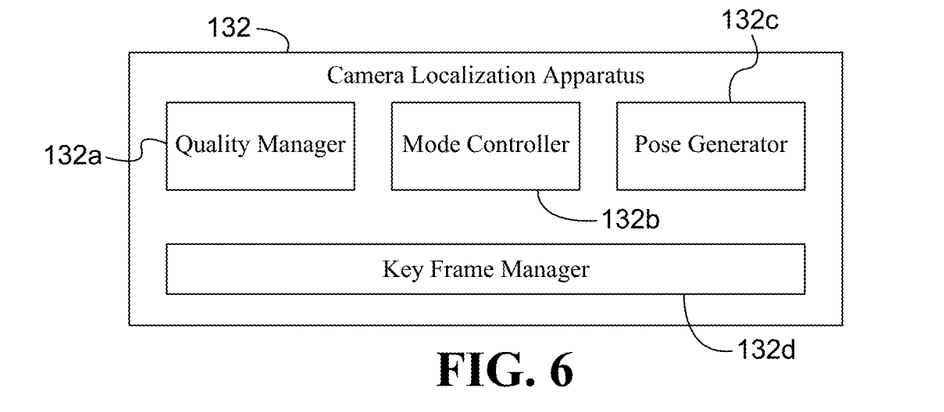
FIG. 6 is a block diagram of an example of a camera localization apparatus according to an embodiment.

FIG. 6 shows a camera localization apparatus 132 (132a-132d). The apparatus 132, which may include fixed-functionality logic hardware, configurable logic, logic instructions, etc., or any combination thereof, may generally implement one or more aspects of the method 24 (FIG. 2), the method 66 (FIG. 4) and/or the method 110 (FIG. 5). In the illustrated example, a quality manager 132a conducts a real-time quality assessment of a depth localization mode, a color localization mode and an inertia localization mode.

Additionally, a mode controller 132b communicatively coupled to the quality manager 132a may select one of the depth localization mode, the color localization mode and the inertia localization mode based on the quality assessment. The illustrated apparatus 132 also includes a pose generator 132c to determine a pose of a camera relative to a 3D environment in accordance with the active localization mode.

As already noted, the depth localization mode may be selected as the active localization mode if the quality assessment indicates that a confidence level associated with the depth localization mode is above a depth quality threshold. Additionally, the inertia localization mode may be selected if the quality assessment indicates that a failure is detected with regard to the depth localization mode or a confidence level associated with the inertia localization mode is above an inertia threshold while the depth localization mode is unavailable. The pose may be a relative pose when the inertia localization mode is active.

The color localization mode may be selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Additionally, a key frame manager 132d may detect a previously unobserved portion of the 3D environment and add depth data, color data and pose data associated with the previously unobserved portion to a set of key frames associated with the 3D environment. In one example, the quality assessment is conducted based depth data, color data and inertia data and the pose includes a position and orientation of the camera relative to the 3D environment. Moreover, the apparatus 132 may include a state machine.

Figure 7:
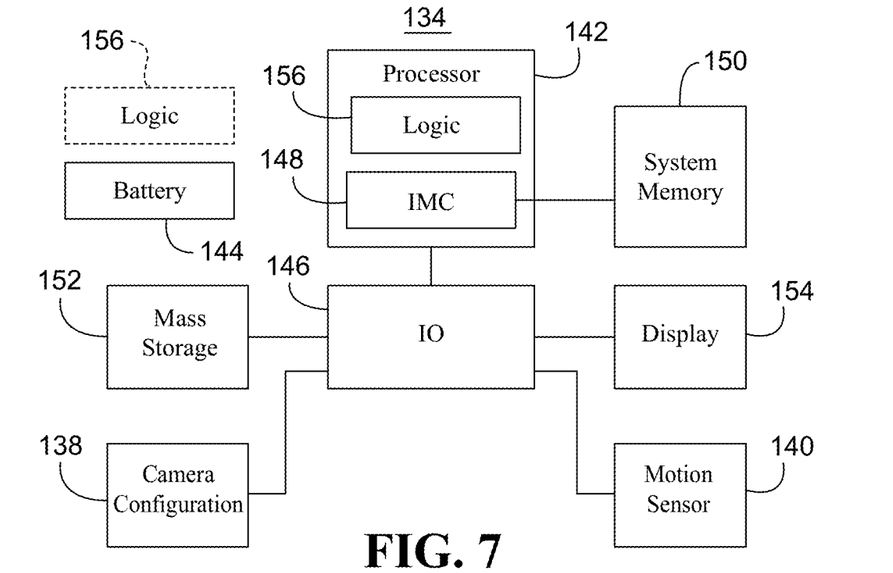
FIG. 7 is a block diagram of an example of an environment translation system according to an embodiment.
Figure 8:
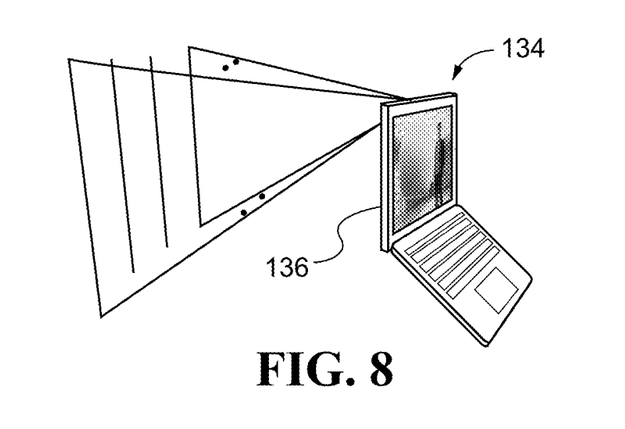
FIG. 8 is a perspective view of an example of an environment translation system according to an embodiment.

Turning now to FIGS. 7 and 8, an environment translation system 134 is shown. The system 134 may include a housing 136 having a mobile form factor, a camera configuration 138 to generate depth data and color data, and a motion sensor 140 to generate inertia data. The illustrated system 134 also includes a processor 142, a battery 144 and an input/output (IO) unit 146. The processor 142, which may include an integrated memory controller (IMC) 148 that communicates with system memory 150 (e.g., RAM), may be incorporated with the IO unit 146 onto a common semiconductor die (not shown) as a system on chip (SoC). The IO unit 146 may function as a host device to the camera configuration 138 and the motion sensor 140, as well as to other components such as, for example, mass storage 152 (e.g., hard disk drive/HDD, solid state disk/SDD, optical disk, flash memory) and a display 154 (e.g., liquid crystal display/LCD, light emitting diode/LED display).

The processor 142 may also include logic 156 that enables the processor to operate as a camera localization apparatus. For example, the logic 156 may conduct a real-time quality assessment of a depth localization mode, a color localization mode and an inertia localization mode. The logic 156 may also select one of the depth localization mode, the color localization mode or the inertia localization mode as an active localization mode based on the quality assessment. Moreover, the logic 156 may determine a pose of the camera configuration 138 and/or the system 134 relative to a 3D environment in accordance with the active localization mode. The logic 156 may also be implemented elsewhere in the system 134. Additionally, the housing 136 may also include other types of form factors such as, for example, wearable form factors (e.g., eyewear, headwear, clothing, jewelry, footwear).

Figure 9:
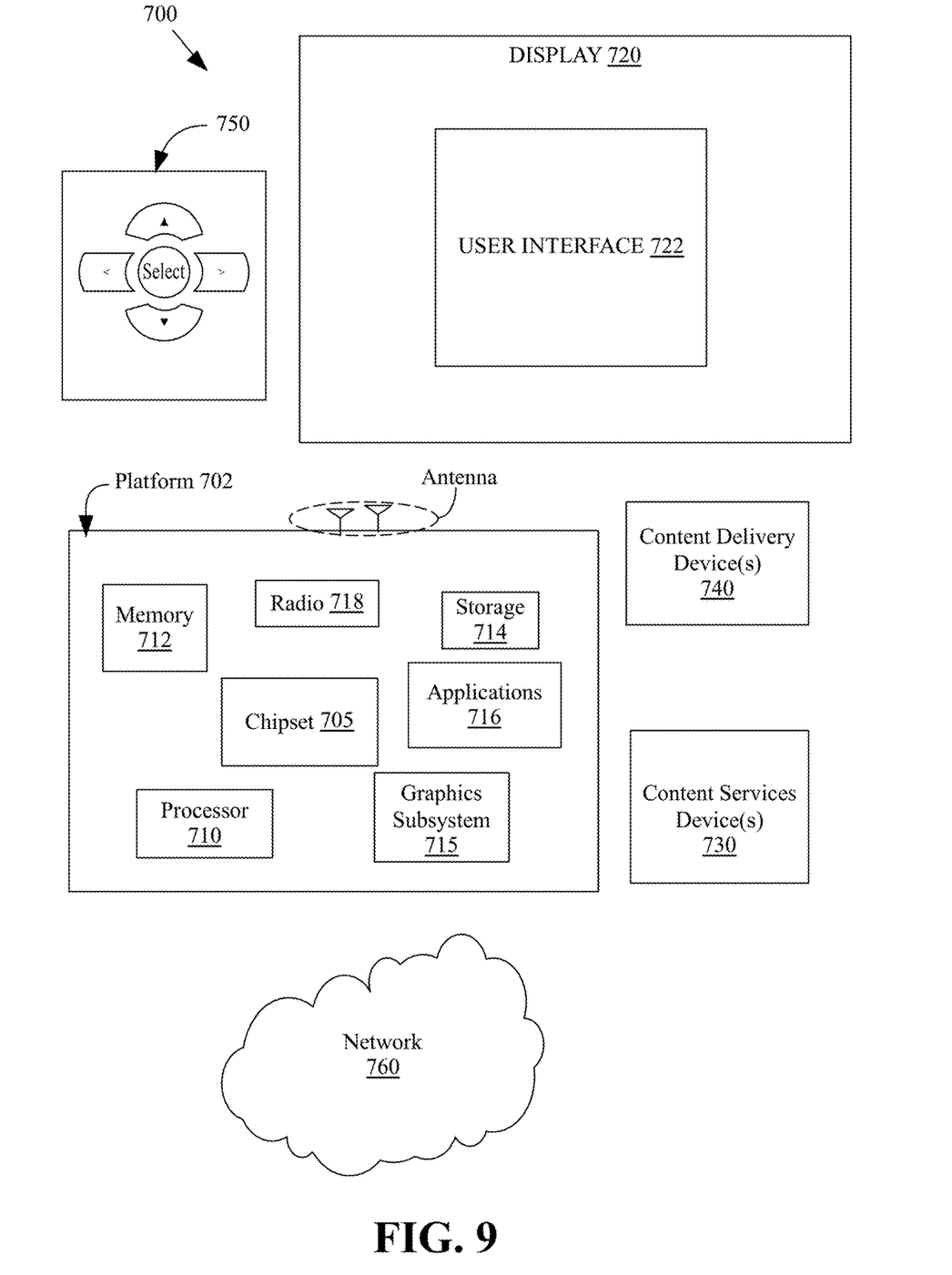
FIG. 9 is a block diagram of an example of a system having a navigation controller according to an embodiment.

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
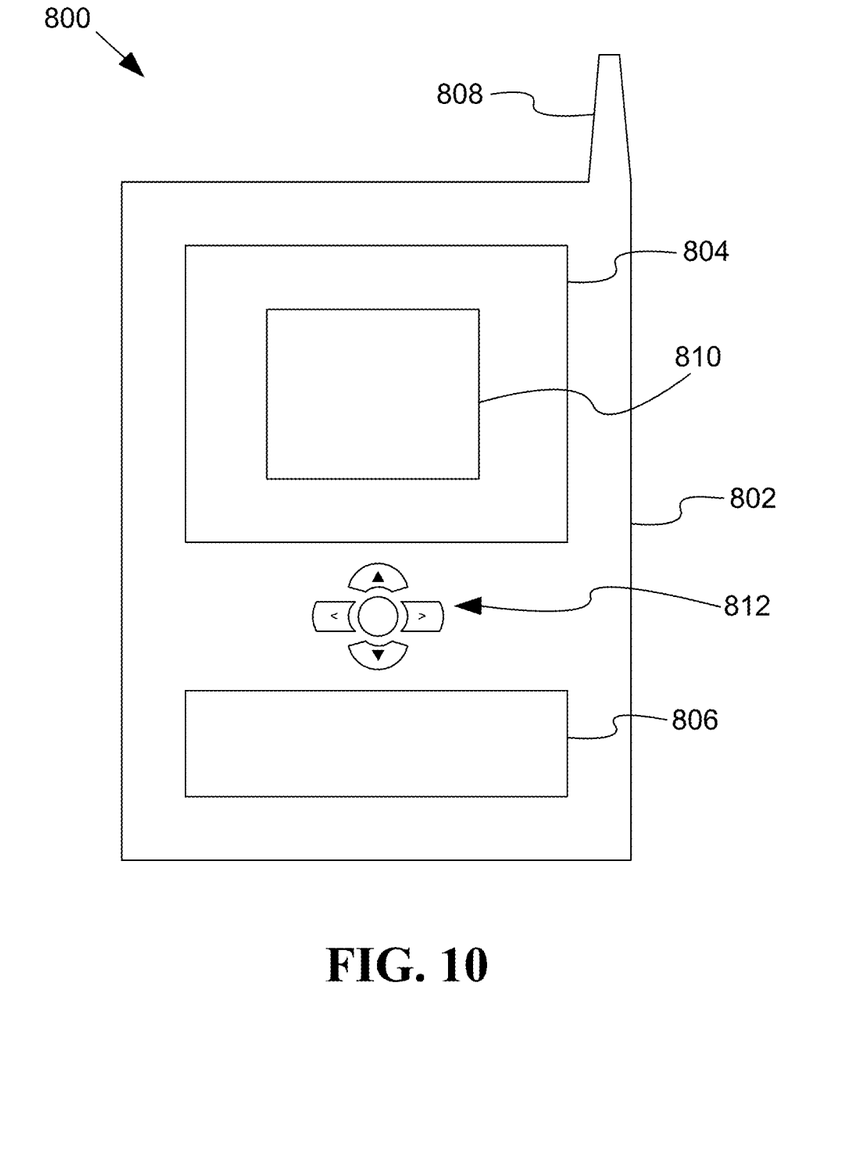
FIG. 10 is a block diagram of an example of a system having a small form factor according to an embodiment.

As described above, the system 700 may be embodied in varying physical styles or form factors. FIG. 10 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Additional Notes and Examples:

Example 1 may include an environment translation system comprising a housing including a mobile form factor, a camera configuration to generate depth data and color data, a motion sensor to generate inertia data, and a camera localization apparatus communicatively coupled to the camera configuration and the motion sensor, the camera localization apparatus comprising a quality manager to conduct a quality assessment of a depth localization mode, a color localization mode and an inertia localization mode based on the depth data, the color data and the inertia data, a mode controller to select one of the depth localization mode, the color localization mode or the inertia localization mode as an active localization mode based on the quality assessment, and a pose generator to determine a pose of the system relative to a three-dimensional (3D) environment in accordance with the active localization mode.

Example 2 may include the system of Example 1, wherein the depth localization mode is to be selected as the active localization mode if the quality assessment indicates that a confidence level associated with the depth localization mode is above a depth quality threshold.

Example 3 may include the system of Example 1, wherein the inertia localization mode is to be selected if the quality assessment indicates that a failure is detected with regard to the depth localization mode or a confidence level associated with the inertia localization mode is above an inertia threshold while the depth localization mode is unavailable, and wherein the pose is to be a relative pose.

Example 4 may include the system of Example 1, wherein the color localization mode is to be selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Example 5 may include the system of any one of Examples 1 to 4, further including a key frame manager to detect a previously unobserved portion of the 3D environment and add depth data, color data and pose data associated with the previously unobserved portion to a set of key frames associated with the 3D environment.

Example 6 may include a camera localization apparatus comprising a quality manager to conduct a quality assessment of a depth localization mode, a color localization mode and an inertia localization mode, a mode controller to select one of the depth localization mode, the color localization mode or the inertia localization mode as an active localization mode based on the quality assessment, and a pose generator to determine a pose of a camera relative to a three-dimensional (3D) environment in accordance with the active localization mode.

Example 7 may include the apparatus of Example 6, wherein the depth localization mode is to be selected as the active localization mode if the quality assessment indicates that a confidence level associated with the depth localization mode is above a depth quality threshold.

Example 8 may include the apparatus of Example 6, wherein the inertia localization mode is to be selected if the quality assessment indicates that a failure is detected with regard to the depth localization mode or a confidence level associated with the inertia localization mode is above an inertia threshold while the depth localization mode is unavailable, and wherein the pose is to be a relative pose.

Example 9 may include the apparatus of Example 6, wherein the color localization mode is to be selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Example 10 may include the apparatus of any one of Examples 6 to 9, further including a key frame manager to detect a previously unobserved portion of the 3D environment and add depth data, color data and pose data associated with the previously unobserved portion to a set of key frames associated with the 3D environment.

Example 11 may include the apparatus of any one of Examples 6 to 9, wherein the quality assessment is to be conducted based on depth data, color data and inertia data and the pose is to include a position and orientation of the camera relative to the 3D environment.

Example 12 may include the apparatus of any one of Examples 6 to 9, further including a state machine.

Example 13 may include a method of operating a camera localization apparatus, comprising conducting a quality assessment of a depth localization mode, a color localization mode and an inertia localization mode, selecting one of the depth localization mode, the color localization mode or the inertia localization mode as an active localization mode based on the quality assessment, and determining a pose of a camera relative to a three-dimensional (3D) environment in accordance with the active localization mode.

Example 14 may include the method of Example 13, wherein the depth localization mode is selected as the active localization mode if the quality assessment indicates that a confidence level associated with the depth localization mode is above a depth quality threshold.

Example 15 may include the method of Example 13, wherein the inertia localization mode is selected if the quality assessment indicates that a failure is detected with regard to the depth localization mode or a confidence level associated with the inertia localization mode is above an inertia threshold while the depth localization mode is unavailable, and wherein the pose is a relative pose.

Example 16 may include the method of Example 13, wherein the color localization mode is selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Example 17 may include the method of any one of Examples 13 to 16, further including detecting a previously unobserved portion of the 3D environment, and adding depth data, color data and pose data associated with the previously unobserved portion to a set of key frames associated with the 3D environment.

Example 18 may include the method of any one of Examples 13 to 16, wherein the quality assessment is conducted based on depth data, color data and inertia data.

Example 19 may include at least one computer readable storage medium comprising a set of instructions, which when executed by a computing device, cause the computing device to conduct a quality assessment of a depth localization mode, a color localization mode and an inertia localization mode, select one of the depth localization mode, the color localization mode or the inertia localization mode as an active localization mode based on the quality assessment, and determine a pose of a camera relative to a three-dimensional (3D) environment in accordance with the active localization mode.

Example 20 may include the at least one computer readable storage medium of Example 19, wherein the depth localization mode is to be selected as the active localization mode if the quality assessment indicates that a confidence level associated with the depth localization mode is above a depth quality threshold.

Example 21 may include the at least one computer readable storage medium of Example 19, wherein the inertia localization mode is to be selected if the quality assessment indicates that a failure is detected with regard to the depth localization mode or a confidence level associated with the inertia localization mode is above an inertia threshold while the depth localization mode is unavailable, and wherein the pose is to be a relative pose.

Example 22 may include the at least one computer readable storage medium of Example 19, wherein the color localization mode is to be selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Example 23 may include the at least one computer readable storage medium of any one of Examples 19 to 22, wherein the instructions, when executed, cause a computing device to detect a previously unobserved portion of the 3D environment, and add depth data, color data and pose data associated with the previously unobserved portion to a set of key frames associated with the 3D environment.

Example 24 may include the at least one computer readable storage medium of any one of Examples 19 to 22, wherein the quality assessment is to be conducted based on depth data, color data and inertia data.

Example 25 may include a camera localization apparatus comprising means for conducting a quality assessment of a depth localization mode, a color localization mode and an inertia localization mode, means for selecting one of the depth localization mode, the color localization mode or the inertia localization mode as an active localization mode based on the quality assessment, and means for determining a pose of a camera relative to a three-dimensional (3D) environment in accordance with the active localization mode.

Example 26 may include the apparatus of Example 25, wherein the depth localization mode is to be selected as the active localization mode if the quality assessment indicates that a confidence level associated with the depth localization mode is above a depth quality threshold.

Example 27 may include the apparatus of Example 25, wherein the inertia localization mode is to be selected if the quality assessment indicates that a failure is detected with regard to the depth localization mode or a confidence level associated with the inertia localization mode is above an inertia threshold while the depth localization mode is unavailable, and wherein the pose is a relative pose.

Example 28 may include the apparatus of Example 25, wherein the color localization mode is to be selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

Example 29 may include the apparatus of any one of Examples 25 to 28, further including means for detecting a previously unobserved portion of the 3D environment, and means for adding depth data, color data and pose data associated with the previously unobserved portion to a set of key frames associated with the 3D environment.

Example 30 may include the apparatus of any one of Examples 25 to 28, wherein the quality assessment is to be conducted based on depth data, color data and inertia data.

Techniques may therefore robustly localize a camera in a physical environment and map the environment to a virtual world in real-time. Several localization methods may be performed separately on multi-modal data. The result is a combination that is able to compensate for each individual method's failure modes and varying accuracy. A dense depth-based mode may provide a primary technique of mapping and localization with the highest accuracy. Using a state machine approach, the current state of the state machine may be the current modality in use. The states may be automatically switched based on the following criteria: the available resources of the target device, current depth quality assessment, and the confidence returned by the various localization modes. The state machine architecture may guarantee a finite number of clearly defined states. Using three distinct modalities and automatically switching between the three modalities may result in fewer interruptions to the user experience.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system comprising:
    a housing including a mobile form factor;
    a camera configuration to generate depth data and color data;
    a motion sensor to generate inertia data; and
    a camera localization apparatus communicatively coupled to the camera configuration and the motion sensor, the camera localization apparatus comprising
        a quality manager comprising one or more processors and/or integrated circuitry, the quality manager to conduct a quality assessment of a depth localization mode, a color localization mode, and an inertia localization mode based respectively on the depth data, the color data, and the inertia data;
        a mode controller comprising the one or more processors and/or integrated circuitry, the mode controller to select one of the depth localization mode, the color localization mode, or the inertia localization mode as an active localization mode based on the quality assessment,
        wherein from an initialization state of the system, the mode controller is to initially select one of the depth localization mode or the color localization mode, but not the inertia localization mode, and
        wherein the mode controller is to transition to the inertia localization mode from one or both the depth localization mode and/or the color localization mode; and
    a pose generator comprising the one or more processors and/or integrated circuitry, the pose generator to determine a pose of the system relative to a three-dimensional (3D) environment in accordance with the active localization mode.

2. The system of claim 1, wherein the mode controller is to initially select the depth localization mode as the active localization mode if the quality assessment indicates that a confidence level associated with the depth localization mode is above a depth quality threshold.

3. The system of claim 1, wherein the quality assessment is an initial quality assessment, and subsequent to the initial selection, the mode controller is to select the inertia localization mode if (i) a subsequent quality assessment indicates that a failure is detected with regard to the depth localization mode or (ii) a confidence level associated with the inertia localization mode is above an inertia threshold while the depth localization mode is unavailable, and wherein the pose is to be a relative pose.

4. The system of claim 1, wherein the mode controller is to select the color localization mode if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

5. The system of claim 1, further including a key frame manager comprising the one or more processors and/or integrated circuitry, the one or more processors and/or integrated circuitry further to detect a previously unobserved portion of the 3D environment and add depth data, color data, and pose data associated with the previously unobserved portion to a set of key frames associated with the 3D environment.

6. A camera localization apparatus comprising:
    a quality manager comprising one or more processors and/or integrated circuitry, the quality manager to conduct a quality assessment of (i) a depth localization mode that is based on depth data, (ii) a color localization mode that is based on color data, and (iii) an inertia localization mode that is based on inertia data;
    a mode controller comprising the one or more processors and/or integrated circuitry, the mode controller to select one of the depth localization mode, the color localization mode, or the inertia localization mode as an active localization mode based on the quality assessment; and
    a pose generator comprising the one or more processors and/or integrated circuitry, the pose generator to determine a pose of a camera relative to a three-dimensional (3D) environment in accordance with the active localization mode;
    wherein from an initialization state of the system, the mode controller is to initially select one of the depth localization mode or the color localization mode, but not the inertia localization mode, wherein the mode controller is to transition to the inertia localization mode from one or both the depth localization mode and/or the color localization mode, and wherein if the inertia localization mode is the active localization mode, and a confidence level associated with the depth localization mode is determined to be above a depth quality threshold, then (i) the apparatus undergoes a reset transition during which a new set of key frames representative of the 3D environment is accumulated, and (ii) the mode controller selects the depth localization mode.

7. The apparatus of claim 6, wherein the mode controller is to select the depth localization mode as the active localization mode if the quality assessment indicates that a confidence level associated with the depth localization mode is above a depth quality threshold.

8. The apparatus of claim 6, wherein the pose is to be a relative pose when the inertia localization mode is active, and wherein the mode controller is to select the inertia localization mode if the quality assessment indicates that: a failure is detected with regard to the depth localization mode, or a confidence level associated with the inertia localization mode is above an inertia threshold while the depth localization mode is unavailable.

9. The apparatus of claim 6, wherein the mode controller is to select the color localization mode if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

10. The apparatus of claim 6, further including a key frame manager comprising the one or more processors and/or integrated circuitry, the one or more processors and/or integrated circuitry further to detect a previously unobserved portion of the 3D environment and add depth data, color data, and pose data associated with the previously unobserved portion to a set of key frames associated with the 3D environment.

11. The apparatus of claim 6, wherein the pose is to include a position and orientation of the camera relative to the 3D environment.

12. The apparatus of claim 6, wherein at least one of the quality manager, mode controller, and pose generator comprise a state machine.

13. A method comprising:
conducting a quality assessment of a depth localization mode, a color localization mode, and an inertia localization mode;
selecting one of the depth localization mode, the color localization mode, or the inertia localization mode as an active localization mode based on the quality assessment, wherein the selecting includes
selecting, from an initialization state, one of the depth localization mode or the color localization mode, but not the inertia localization mode, as the active localization mode,
selecting the inertia localization mode as the active localization mode, if (1) the color localization mode is active, (2) a confidence level associated with the inertia localization mode is determined to be above an inertia quality threshold, and (3) the depth localization mode is unavailable, and
selecting the depth localization mode as the active localization mode, if (1) the color localization mode is active, and (2) a confidence level associated with the depth localization mode is determined to be above a depth quality threshold; and
determining a pose of a camera relative to a three-dimensional (3D) environment in accordance with the active localization mode.

14. The method of claim 13, wherein quality assessment is a second quality assessment, and wherein the depth localization mode is selected as the active localization mode if a first quality assessment conducted prior to the second quality assessment indicates that a confidence level associated with the depth localization mode is above a depth quality threshold.

15. The method of claim 13, wherein the pose is to be a relative pose when the inertia localization mode is active, and wherein the inertia localization mode is selected if the quality assessment indicates that a failure is detected with regard to the depth localization mode or a confidence level associated with the inertia localization mode is above an inertia threshold while the depth localization mode is unavailable.

16. The method of claim 13, wherein the color localization mode is selected if the quality assessment indicates that an initial confidence level associated with the depth localization mode is below a depth quality threshold, a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

17. The method of claim 13, further including:
detecting a previously unobserved portion of the 3D environment; and
adding depth data, color data, and pose data associated with the previously unobserved portion to a set of key frames associated with the 3D environment,
wherein the quality assessment is conducted based on depth data, color data, and inertia data.

18. At least one non-transitory computer readable storage medium comprising a set of instructions, which when executed by a computing device, cause the computing device to:
conduct a quality assessment of a depth localization mode, a color localization mode, and an inertia localization mode;
select one of the depth localization mode, the color localization mode, or the inertia localization mode as an active localization mode based on the quality assessment,
wherein from a first instance of an initialization state, the depth localization mode is selected if an initial confidence level associated with the depth localization mode is above a depth quality threshold,
wherein from a second instance of an initialization state, the color localization mode is selected if the initial confidence level associated with the depth localization mode is below the depth quality threshold; and determine a pose of a camera relative to a three-dimensional (3D) environment in accordance with the active localization mode.

19. The A gaming system comprising the at least one non-transitory computer readable storage medium of claim 18.

20. The at least one non-transitory computer readable storage medium of claim 18, wherein the quality assessment if a first quality assessment, wherein the inertia localization mode is to be selected if a second quality assessment conducted after the first quality assessment indicates that a failure is detected with regard to the depth localization mode or a confidence level associated with the inertia localization mode is above an inertia threshold while the depth localization mode is unavailable, and wherein the pose is to be a relative pose.

21. The at least one non-transitory computer readable storage medium of claim 18, wherein the color localization mode is to be selected if a failure is detected with respect to the depth localization mode while the inertia localization mode is unavailable, a failure is detected with respect to the inertia localization mode while the inertia localization mode is the active localization mode, or a confidence level associated with the inertia localization mode drops below an inertia threshold while the inertia localization mode is the active localization mode.

22. The at least one non-transitory computer readable storage medium of claim 18, wherein the instructions, when executed, cause a computing device to:
    detect a previously unobserved portion of the 3D environment; and
    add depth data, color data, and pose data associated with the previously unobserved portion to a set of key frames associated with the 3D environment,
    wherein the quality assessment is to be conducted based on depth data, color data, and inertia data.

23. The at least one non-transitory computer readable storage medium of claim 18, wherein the quality assessment is to be conducted based on depth data, color data and inertia data.

24. The system of claim 1, wherein the mode controller is to transition from the inertia localization mode to one of the depth localization mode or the color localization mode, in response to a determination that the depth data has accumulated drift.

* * * * *